United States Patent
Ide

(10) Patent No.: US 10,037,759 B2
(45) Date of Patent: Jul. 31, 2018

(54) VOICE PROCESSING DEVICE, VOICE PROCESSING METHOD, AND NON-TRANSITORY RECORDING MEDIUM THAT STORES PROGRAM

(71) Applicant: CASIO COMPUTER CO., LTD., Shibuya-ku, Tokyo (JP)

(72) Inventor: Hiroyasu Ide, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 86 days.

(21) Appl. No.: 14/251,201

(22) Filed: Apr. 11, 2014

(65) Prior Publication Data

US 2014/0337027 A1    Nov. 13, 2014

(30) Foreign Application Priority Data

May 8, 2013    (JP) .................................. 2013-098683

(51) Int. Cl.
*G10L 17/14*    (2013.01)

(52) U.S. Cl.
CPC .................................. *G10L 17/14* (2013.01)

(58) Field of Classification Search
None
See application file for complete search history.

(56) References Cited

U.S. PATENT DOCUMENTS

| | | | |
|---|---|---|---|
| 2007/0213981 A1* | 9/2007 | Meyerhoff et al. | 704/243 |
| 2008/0052074 A1* | 2/2008 | Gopinath | G10L 15/142 704/256 |
| 2012/0245941 A1* | 9/2012 | Cheyer | G06F 21/32 704/246 |

FOREIGN PATENT DOCUMENTS

JP    2004-145161 A    5/2004

* cited by examiner

*Primary Examiner* — Lennin Rodriguezgonzale
(74) *Attorney, Agent, or Firm* — Holtz, Holtz & Volek PC

(57) ABSTRACT

A voice processing device includes: an acquirer which acquires feature quantities of vowel sections included in voice data; a classifier which classifies, among the acquired feature quantities, feature quantities corresponding to a plurality of same vowels into a plurality of clusters for respective vowels with unsupervised classification; and a determiner which determines a combination of clusters corresponding to the same speaker from clusters classified for the plurality of vowels.

12 Claims, 15 Drawing Sheets

| VOWEL TYPE | VOWEL SECTION | FEATURE QUANTITY | | | |
|---|---|---|---|---|---|
| | | F1 | F2 | F3 | ... |
| a | VI1 | f11 | f12 | f13 | ... |
| i | VI2 | f21 | f22 | f23 | ... |
| ... | ... | ... | ... | ... | ... |

FT

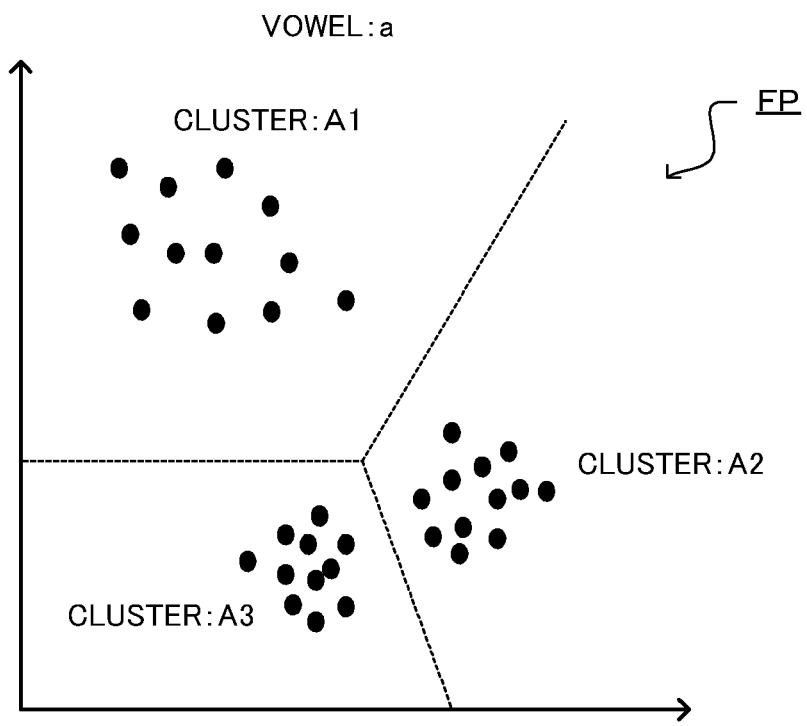

FIG.6A

CANDIDATE COMBINATION
C1={A1,I1,U1,E1,O1}

{PAIR INCLUDED IN COMBINATION}(PAIR SCORE)

{A1,I1}(7),{A1,U1}(2),{A1,E1}(3),{A1,O1}(2),
{I1,U1}(3),{I1,E1}(4),{I1,O1}(6),
{U1,E1}(2),{U1,O1}(6),
{E1,O1}(5),

↓

COMBINATION SCORE=7+2+3+2+3+4+6+2+6+5

FIG.6B

CST

| COMBINATION ID | VOWEL TYPE | | | | | COMBINATION SCORE |
|---|---|---|---|---|---|---|
| | a | i | u | e | o | |
| C1 | A1 | I1 | U1 | E1 | O1 | 40 |
| C2 | A1 | I1 | U1 | E1 | O2 | 11 |
| C3 | A1 | I1 | U1 | E1 | O3 | 25 |
| ... | ... | ... | ... | ... | ... | ... |
| CN | A3 | I3 | U3 | E3 | O3 | 45 |

FIG.7

| SPEAKER NUMBER | VOWEL TYPE | | | | |
|---|---|---|---|---|---|
| | a | i | u | e | o |
| P1 | A3 | I1 | U2 | E2 | O1 |
| P2 | A2 | I3 | U1 | E3 | O2 |
| P3 | A1 | I2 | U3 | E1 | O3 |

DCT

VOWEL(CLUSTER):    a1(A1)    i1(I2)    ⋯    a2(A3)    ⋯

VOICE DATA: (TEMPORARY SPEAKER NUMBER)

VOICE SECTION:    VI1    VI2    ⋯    VIn    ⋯

PT

| ID | VOICE SECTION | PERSONAL ID (TEMPORARY SPEAKER NUMBER) |
|---|---|---|
| a1 | VI1 | P3 |
| a2 | VIn | P1 |
| a3 | VIm | P1 |
| ... | ... | ... |

| VOICE SECTION | SPEAKER NUMBER (DEFINITE SPEAKER NUMBER) |
|---|---|
| ... | ... |
| VIk | P1 |
| CIj | P1 |
| VIk+1 | P1 |
| ... | ... |

DST

VOICE PROCESSING DEVICE, VOICE PROCESSING METHOD, AND NON-TRANSITORY RECORDING MEDIUM THAT STORES PROGRAM

CROSS-REFERENCE TO RELATED APPLICATION

This application claims the benefit of Japanese Patent Application No. 2013-098683, filed on May 8, 2013, the entire disclosure of which is incorporated by reference herein.

FIELD

The present disclosure relates to a voice processing device, a voice processing method, and a non-transitory recording medium that stores a program.

BACKGROUND

With the spread of small recording apparatuses including IC recorders, an opportunity to record voices of a plurality of speakers who irregularly alternate one after another such as in a meeting and in a round-table discussion is increasing. To efficiently utilize recorded voice data, a technique that identifies who made an utterance and when the utterance was made in voice data has been developed (For example, Patent Literature 1: Unexamined Japanese Patent Application Kokai Publication No. 2004-145161). This technique is called Speaker Diarization.

A technique that Patent Literature 1 discloses identifies a speaker by comparing a feature quantity in a voice section of recorded data and a feature quantity of prerecorded voices of the speaker.

In the technique of Patent Literature 1, to identify a speaker, a feature quantity of voices of a subject speaker needs to be recorded in advance. In other words, an unknown speaker without registration cannot be a processing object.

The present disclosure was devised in consideration of the above-problem, and aims to provide a voice processing device, a voice processing method, and a program, which easily carry out speaker diarization without prior registration of a speaker.

SUMMARY

A voice processing device according to the present disclosure comprises: acquirer which acquires feature quantities of vowel sections included in voice data; classifier which classifies, among the acquired feature quantities, feature quantities that correspond to a plurality of same vowels into a plurality of clusters for respective vowels with unsupervised classification; and determiner which determines a combination of clusters corresponding to a same speaker from clusters that are classified for the plurality of vowels.

According to the present disclosure, speaker diarization can be easily carried out without prior registration of a speaker.

BRIEF DESCRIPTION OF THE DRAWINGS

A more complete understanding of this application can be obtained when the following detailed description is considered in conjunction with the following drawings, in which:

FIG. 4A is a conceptual view of clustering processing of feature quantities;

FIG. 4B is a diagram showing an example of a clustering table;

FIG. 6A is a diagram for illustrating a method of calculating a combination score;

FIG. 6B is a diagram showing an example of a combination score table;

FIG. 7 is a diagram showing an example of a determined combination table;

DETAILED DESCRIPTION

Figure 1:
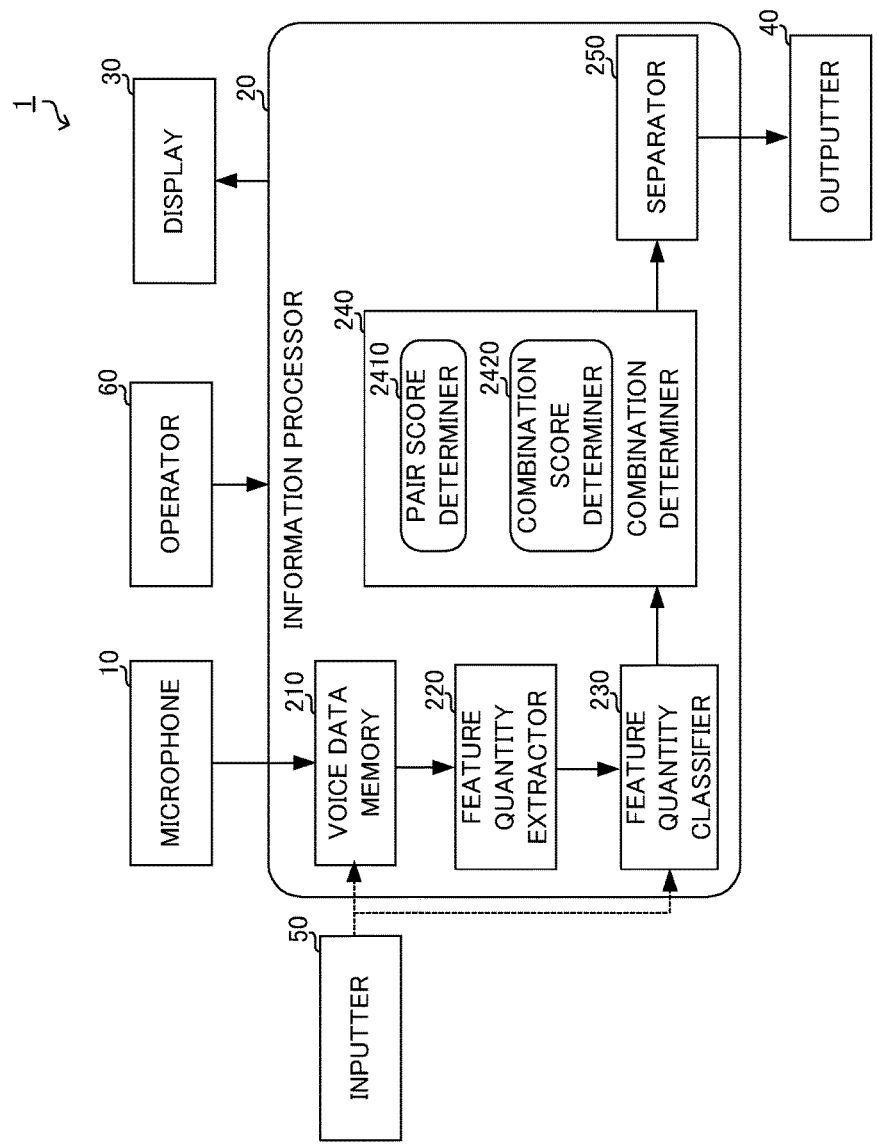
FIG. 1 is a block diagram showing a functional configuration of a voice processing device according to a first embodiment of the present disclosure.

In the following, a voice processing device according to the embodiments for carrying out the present disclosure will be described with reference to the drawings. It is noted that the same signs and numerals are assigned to the same or equivalent components in the drawings.

First Embodiment

A voice processing device 1 according to a first embodiment comprises: i) a recording function that records a voice using a microphone; ii) a feature quantity extraction function that extracts a feature quantity of a voice section from recorded voice data; iii) a separation function that separates voice sections for each speaker based on the extracted feature quantities; iv) an output function that outputs the separation result.

As shown in FIG. 1, the voice processing device 1 comprises a microphone 10, an information processor 20, a display 30, an outputter 40, an inputter 50, and an operator 60.

The microphone 10 is a microphone that includes a converter that converts sound waves to electric signals and a transmitter that transmits the converted electric signals to the information processor 20. Having such a physical configuration, the microphone 10 converts voices uttered by a plurality of speakers to electric signals and transmits the electric signals to the information processor 20. The following is a description of an example of a case in which a conversation by a plurality of speakers using Japanese that includes five vowels, "a," "i," "u," "e," and "o" is recorded.

Figure 2:
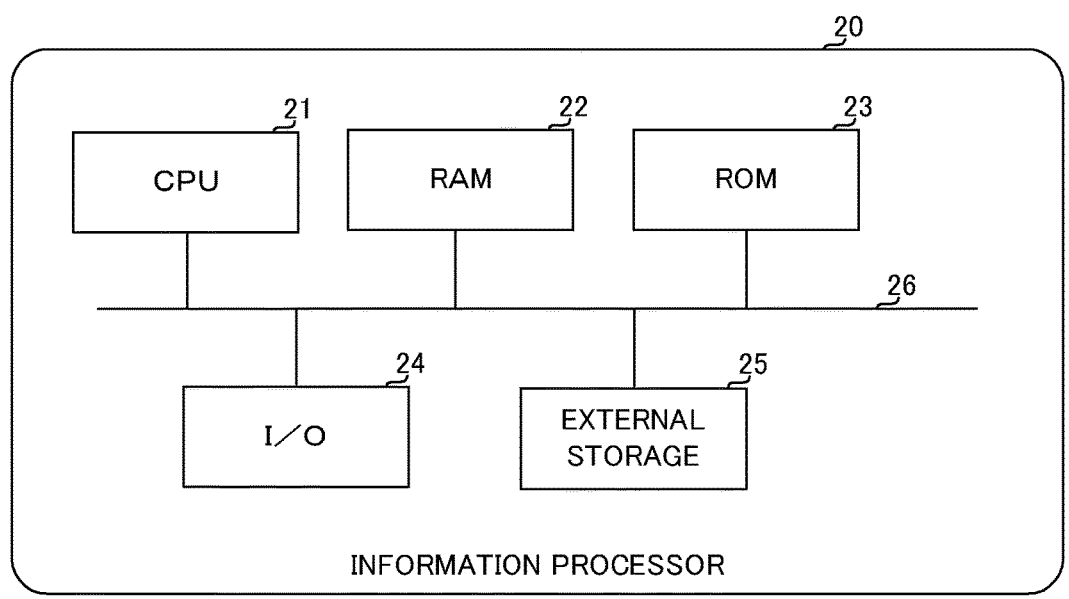
FIG. 2 is a block diagram showing a physical configuration of an information processor.

The information processor 20 is physically configured by, as shown in FIG. 2, a Central Processing Unit (CPU) 21, a Random Access Memory (RAM) 22, a Read-Only Memory (ROM) 23, an Inputter/Outputter (I/O) 24, an external storage 25, and an internal bus 26.

The CPU 21 is a central processing unit that controls a variety of functions of the voice processing device 1, and executes a program that is loaded from the ROM 23 to the RAM 22 to carry out processing as will be described later.

The RAM 22 is a volatile memory that temporarily stores a program, to be executed by the CPU 21, and intermediate data, and is used as a work area for the CPU 21 to carry out various processing.

The ROM 23 is a non-volatile memory that stores a program to be executed by the CPU 21.

The I/O 24 is configured by an interface device, such as a Universal Serial Bus (USB), a serial port, and an Ethernet adapter, and realizes input and output of information between the information processor 20 and the display 30, operator 60, and other external devices that are connected thereto. The I/O 24 functions as the inputter 50 and the outputter 40 in FIG. 1.

The external storage 25 is non-volatile storage, such as a hard disk drive, a Compact Disc Read Only Memory (CD-ROM), and a flash memory, and stores data such as an acoustic model to be used in the processing as will be described later.

It is noted that the CPU 21, the RAM 22, the ROM 23, the I/O 24 and the external storage 25 are connected to one another via the internal bus 26, and can transmit information to one another.

With the above-described physical configuration, the information processor 20 functions as: a voice data memory 210; a feature quantity extractor 220; a feature quantity classifier 230; a combination determiner 240 that includes a pair score determiner 2410 and a combination score determiner 2420; and a separator 250. Details of the information processor 20 will be described later.

The display 30 is configured by a liquid crystal display or the like, and displays information transmitted from the information processor 20.

The outputter 40 receives output data such as voice data and information indicating a result of speaker diarization, as will be described later, from the information processor 20, and outputs the output data to an external device.

The inputter 50 receives input data such as voice data and feature quantity data from an external device, and transmits the input data to the information processor 20. When receiving a feature quantity of a vowel section as input data, as will be described later, the inputter 50 functions as an acquirer which acquires a feature quantity.

The operator 60 is configured by an operation receiving device, such as a touch panel, a keyboard, a button, or a pointing device, that receives user operation, and a transmitter that transmits the operation information received by the operation receiving device to the information processor 20. With such a physical configuration, the operator 60 receives user operation and transmits the operation information to the information processor 20.

In the following, functions of the information processor 20 will be described. As shown in FIG. 1, the information processor 20 includes, as function units, the voice data memory 210, the feature quantity extractor 220, the feature quantity classifier 230, the combination determiner 240 that includes the pair score determiner 2410 and the combination score determiner 2420, and the separator 250.

The voice data memory 210 stores signals (voice signals) transmitted from the microphone 10 as voice data. Alternatively, the voice data memory 210 stores voice data that the inputter 50 received from an external device. The voice data memory 210 transmits the recorded voice data that is to be a processing object to the feature quantity extractor 220.

Figures 3A, 3B:
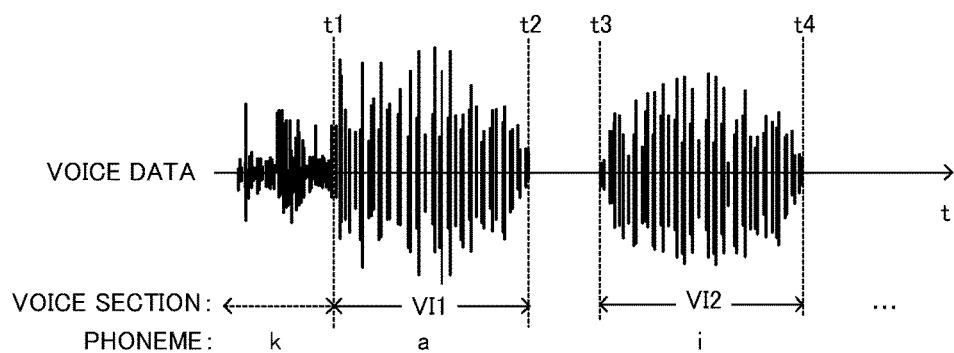
FIG. 3A is a diagram for illustrating processing of phoneme recognition of voice data.
FIG. 3B is a diagram showing an example of a feature quantity table.

The feature quantity extractor 220 acquires a feature quantity of a vowel section included in the voice data transmitted from the voice data memory 210. To acquire the feature quantity of the vowel section, the feature quantity extractor 220 first carries out phoneme recognition to the voice data. In particular, the feature quantity extractor 220 extracts an acoustic feature quantity by estimating, as a voice section, a portion of which volume (power) exceeds a predetermined threshold in the voice data. Then, the feature quantity extractor 220 compares the acoustic feature quantity with a feature quantity of each phoneme in an acoustic model and determines a phoneme that is the most similar to the acoustic feature quantity as a phoneme of the voice section (FIG. 3A). Here, when a degree of similarity of the most similar phoneme is less than a predetermined threshold, the section may be excluded from a processing object as a non-voice section.

For example, in order to determine a phoneme regardless of individual and sex variation, a general acoustic model created based on voices of many speakers is stored in advance in the ROM 23 or the external storage 25. This acoustic model includes feature quantities of each vowel and consonant included in the language that a speaker uses (in this example, Japanese).

Here, to simplify the case, all speakers involved in the voice data are supposed to utter the language corresponding to one acoustic model stored in the voice processing device 1. In order to enable processing of a plurality of languages with a single voice processing device 1, a plurality of acoustic models respectively corresponding to a plurality of languages may be prepared, and the optimum acoustic model may be selected based on setting operation by a user. Further, an acoustic model according to sex/age of a speaker may be selected.

The feature quantity extractor 220 extracts a feature quantity of a voice section of vowels (vowel section) that is identified as a result of the voice recognition. Here, 16-dimensional Immittance Spectral Pairs (ISPs) are extracted as a feature quantity. Then, the feature quantity extractor 220 transmits information (refer to FIG. 3B) that associates the feature quantity of the extracted vowel section with time information and a vowel type to the feature quantity classifier 230. Since the feature quantity extractor 220 acquires a feature quantity of a vowel section included in the voice data, the feature quantity extractor 220 is also referred to as an acquirer.

It is noted that ISPs are employed as a feature quantity, considering that ISPs highly maintain individual characteristics of a speaker throughout a plurality of vowel sections. However, in the present disclosure, arbitrary feature quantities may be employed without limitation, including Line Spectral Pairs (LSPs) and Mel-Frequency Cepstral Coefficients (MFCCs).

For example, as shown in FIG. 3A, a vowel "a" is recorded during time t1-t2 (a vowel section VI1) in the voice data and a vowel "i" is recorded during time t3-t4 (a vowel section VI2), respectively. In such a case, the feature quantity extractor 220 identifies, for each vowel section, information that identifies a vowel (for example, "a" in the vowel section VI1), information of a voice section (VI1, VI2 . . . ), and a feature quantity of the voice section. The information of the vowel section includes information that indicates timing of the voice section (for example, start time t1 and end time t2 of VI1). Then, the identified information is associated and stored in a feature quantity table FT (FIG. 3B). After storing information of all vowels that appear in the voice data in the feature quantity table, the feature quantity extractor 220 transmits the generated feature quantity table FT to the feature quantity classifier 230.

The feature quantity classifier 230 classifies, among the acquired feature quantities, feature quantities corresponding to the same vowels to a plurality of clusters with unsupervised classification. It is noted that the feature quantity classifier 230 may acquire a feature quantity of a vowel section from an external device via the inputter 50.

In particular, the feature quantity classifier 230 first divides, for each vowel (in Japanese, five types of "a," "i," "u," "e," and "o"), feature quantities that are included in the feature quantity table transmitted from the feature quantity extractor 220. Then, for each divided feature quantity table, the feature quantity classifier 230 divides, by clustering, the feature quantities into clusters of the known number of speakers in a feature quantity space. The clustering is unsupervised classification processing that classifies feature quantities to clusters of the number of speakers by unsupervised learning without using correct supervised data beforehand.

In this embodiment, the number of speakers is input in advance by a user using the operator 60. The input number of the speakers is stored in the RAM 22 as setting information.

FIG. 4A is a conceptual view of clustering that the feature quantity classifier 230 carries out. In FIG. 4A, clustering is performed according to arrangement of feature quantities indicated by black dots in a two-dimensional feature quantity space FP, and a classification result of the feature quantities is indicated as three clusters that are partitioned by the dotted lines. Here, the coordinate axes of the feature quantity space FP correspond to parameters of the feature quantities. Alternatively, when the dimensions are reduced by principal component analysis, the feature quantities are clustered after carrying out a coordinate transformation to a space where each coordinate axis corresponds to one of the principal component scores. In this case, the coordinate axes of n-dimensional feature quantity space FP correspond to any of the first to nth principal component scores.

In this embodiment, clustering is carried out by vector-quantizing feature quantities that are collected for each vowel with Linde-Buzo-Gray (LBG) method and creating a Vector Quantization (VQ) table. The VQ table is also referred to as a codebook.

The created VQ table includes a representative vector of vowel feature quantities of each speaker in the feature space. A feature quantity of each vowel section is quantized to a representative value that is closest in a distance (for example, Mahalanobis distance) among representative values included in the VQ table. That is, if the representative vector is considered as a cluster, each feature quantity is classified in any one of a plurality of clusters.

It is noted that the clustering method is not limited to the above method. For example, the VQ table may be created with Pairwise Nearest Neighbor (PNN) method instead of the LBG method. Alternatively, the clustering method can be substituted by an arbitrary known method for unsupervised cluster analysis, including a hierarchical clustering, such as a group average method and Ward method, or a clustering method using Self-Organizing Maps (SOM). With any clustering method, clusters obtained as a result of clustering are made by sorting feature quantities of vowels as processing objects for respective speakers. Ideally, vowel sections of feature quantities included in each cluster are all uttered from a single speaker. Then, the representative value of the cluster can be considered as a vowel feature quantity of the speaker.

After clustering is carried out for all vowels, the feature quantity classifier 230 transmits a clustering result to the combination determiner 240. For example, if feature quantities of the vowel "a" are divided into three clusters A1 to A3 in the feature quantity space FP as schematically shown in FIG. 4A, the feature quantity extractor 220 creates, for example, a cluster table CT as shown in FIG. 4B.

In the cluster table CT, "vowel ID" (a1-a3 in FIG. 4B) that is allocated in chronological order according to vowel types, a section "vowel section" (VI1, VIk, VIj . . . in FIG. 4B) in voice data where the vowel appears, and a cluster (A1-A3 in FIG. 4B) to which a feature quantity of the vowel section belongs, are associated and stored. The feature quantity classifier 230 carries out clustering for all vowels of "a" to "o," creating a cluster table CT. Then, the feature quantity classifier 230 transmits the created cluster table CT to the combination determiner 240.

In this way, the feature quantity classifier 230 carries out processing of classifying feature quantities corresponding to the same vowels into a plurality of clusters with unsupervised classification for each vowel included in the language that a speaker used. By using unsupervised classification, an unregistered speaker (speaker whose voice feature quantities are unknown) can also become a processing object in the classification. Further, as the number of speakers that a user inputs in advance is used for clustering, processing of estimating the number of speakers can be omitted, thereby reducing the processing amount. Moreover, reduction in the clustering precision due to an estimation error of the number of speakers can be prevented. Particularly, as the number of people who joined a conversation (the number of speakers) is often known by a user who recorded the conversation, the user's burden of setting the number of speakers is small.

Further, the feature quantity classifier 230 carries out clustering processing for each vowel. In other words, since the clustering object can be limited to feature quantities of the same phoneme (vowel), the clustering precision becomes higher than a case in which batch clustering is carried out for a plurality of phonemes that have different features. That is, feature quantities included in a cluster created by clustering are likely to be feature quantities of a vowel section that the same speaker pronounced. In other words, a cluster created by classification highly likely corresponds to the same speaker.

Further, since the clustering is carried out by focusing on feature quantities of vowels in which individual characteristics of a speaker strongly appear, feature quantities which are to be processing objects can be reduced. Moreover, the clustering precision can be protected from degradation due to influences by environmental sounds or consonants in which individual characteristics of a speaker do not appear (are not likely to appear).

The combination determiner 240 determines a combination (corresponding combination) that corresponds to the same speaker among classified cluster combinations based on the timing, in the voice data, when vowel sections of feature quantities included in the clusters classified by the feature quantity classifier 230 appear.

The corresponding combination is a combination in which all clusters correspond to the same speaker, among combinations of clusters that are extracted one each for each vowel.

As a result of the above-described clustering, feature quantities of respective vowel sections are classified into separate clusters for respective speakers. However, since the clustering is performed for each vowel, correspondence relation that a speaker identified in a certain cluster of a certain vowel corresponds to which clusters of other vowels is unknown. Thus, in this embodiment, the combination determiner 240 determines a cluster combination that corresponds to each speaker.

To determine a combination, the pair score determiner 2410 first determines a pair score that indicates a corresponding degree to the same speaker for a cluster pair made by extracting one cluster each from clusters classified by the feature quantity classifier 230 for two different vowels (vowel pair).

When the feature quantity classifier 230 clusters feature quantities for each of the five vowels included in Japanese as in this example, there are {"a", "i"}, {"a", "u"}, {"e", "o"} . . . , that is, $_5C_2$=10 vowel pairs. The pair score determiner 2410 carries out processing of calculating pair scores, as will be described later, for all combinations (10 patterns in this example) of vowel pairs each made by extracting two vowels from the classified result by the feature quantity classifier 230.

One vowel pair includes two different vowels for which the feature quantity classifier 230 carried out classification processing. The pair score determiner 2410 determines a pair score for a pair of clusters (a cluster pair) extracted one each from a cluster group as a result of classification for one vowel and from a cluster group as a result of classification for the other vowel. When the vowel pair is "a" and "i" and three clusters are classified for each vowel, there are nine patterns of pairs: "cluster A1" and "cluster I1," "cluster A1" and "cluster I2," . . . "cluster A3" and "cluster I3" (refer to FIG. 5B). When the number of vowels is N and the number of clusters (the number of speakers) is M, a total of $_NC_2 \times M \times M$ (units) of cluster pairs are defined. The pair score determiner 2410 calculates pair scores for these cluster pairs with a method as will be described later.

Figure 5A:
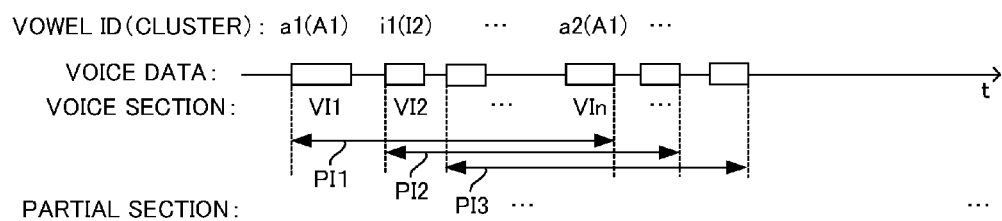
FIG. 5A is a diagram for illustrating processing of counting frequency.
Figure 5B:
FIG. 5B is a diagram showing an example of a frequency table and a pair score table.

In this embodiment, the pair score determiner 2410 determines a pair score based on frequency of co-occurrence of vowel sections of feature quantities included in one cluster and vowel sections of feature quantities included in the other cluster in a partial section of voice data. With reference to FIGS. 5A and 5B, a specific example of a method of calculating a pair score will be described. The pair score determiner 2410 defines a partial section, in voice data, that includes a predetermined number of phonemes by shifting by one phoneme at a time (PI1, PI2 . . . in FIG. 5A). Then, the pair score determiner 2410 counts frequency of co-occurrence, in the same partial section, of the vowel sections included in a cluster pair. It is noted that the number of phonemes included in the partial section is preferably selected and set from the range of five to ten.

For example, when a vowel section with a feature quantity that belongs to one cluster (for example, cluster A1) of a cluster pair and a vowel section with a feature quantity that belongs to the other cluster (for example, cluster I1) appear in a certain partial section PIk, no matter what the number of appearance may be, the frequency is counted by regarding the number of coexistence of A1 and I1 as one.

Alternatively, after defining partial sections by equally dividing data in terms of time, for example, a partial section PI1 is 1 second to m seconds and a partial section PI2 is m+1 seconds to 2 m seconds, the frequency may be counted as follows. Suppose that a vowel section with a feature quantity that belongs to one cluster (for example, cluster A1) of a cluster pair appears (a) times and a vowel section with a feature quantity that belongs to the other cluster (for example, cluster I1) appears (b) times in a partial section PIk. In such a case, the frequency of coexistence of both vowel sections can be defined in a plurality of ways such as (a+b) times and (a×b) times. Thus, a total of combinations made by extracting one vowel section each from a respective cluster of the cluster pair, a×b/2 times, is defined as frequency of co-occurrence in the partial section PIk. For example, even when the value of a+b is as much as 100, if the value is biased, for example a=99 and b=1, a corresponding degree of both clusters to the same person is considered low. Thus, by defining the frequency as a×b/2 times, the frequency can be measured in a manner that the corresponding degree to the same person is more appropriately reflected.

The pair score determiner 2410 counts frequency of coexistence of vowel sections of a cluster pair for each partial section. The counted frequency can be shown, for example, as a pair frequency table PFT of FIG. 5B. In the pair frequency table PFT of FIG. 5B, among cluster pairs of a vowel pair {"a", "i"}, the frequency of co-occurrence of {A2, I1} is the largest with 1039. The higher the frequency of a pair is, the higher is the probability that vowel sections included in two clusters in the pair appear closely in terms of time. In a conversation, the frequency of switching of speakers is far less than the frequency of new vowel being pronounced. Thus, it is highly probable that feature quantities of vowel sections that appear in close proximity in voice data are feature quantities of the same speaker. Thus, in this embodiment, cluster scores are set so that the higher the counted frequency of the cluster pair is, the higher a corresponding degree to the same speaker is.

In this embodiment, to reduce processing load, the order of frequency in the pair frequency table PFT is used as a pair score as is. In particular, as shown in FIG. 5B, the pair score determiner 2410 reassigns numerical values in the descending order of the frequency values from one for respective cells of the pair frequency table PFT to convert the table to the pair score table PST. In the pair score table PST, the lower the pair score is, the higher a corresponding degree to the same speaker is.

It is noted that, as for the method of calculating a pair score based on the frequency, the pair score can be calculated using other methods in which the corresponding degree to the same speaker becomes higher as the frequency is higher. For example, if the frequency value is defined as ft, the pair score ps may be calculated using the following formula (1):

$$ps = 1/\log(ft) \quad (1)$$

Further, the pair score may be configured so that the corresponding degree to the same speaker is higher as the pair score is higher. In such a case, the pair score may be calculated, for example, using the following formula (2):

$$ps=\log(ft) \quad (2)$$

The combination determiner 240 determines a score (a combination score) that indicates a corresponding degree to the same speaker for a combination of clusters extracted one each from all vowels based on the pair scores calculated by the pair score determiner 2410. In particular, the combination score determiner 2420 defines all combinations of clusters extracted one each from cluster groups of respective vowels as candidates of the combination corresponding to the same speaker, then calculates a combination score for each candidate by a method to be described later. Thereafter, a combination with the highest calculated combination score is determined as a corresponding combination that corresponds to the same speaker.

The combination score determiner 2420 extracts, for each candidate combination, all cluster pairs included in the combination. For example, if a candidate combination that is currently the processing object is a combination C1 (including a cluster A1, a cluster I1, a cluster U1, a cluster E1, and a cluster O1) shown in FIG. 6A, ten cluster pairs of {A1, I1}, {A1, U1}, . . . , {E1, O1} are extracted. Then, a value calculated by adding cluster scores of the extracted cluster pairs is defined as a combination score of the candidate combination (refer to FIG. 6A).

The number of candidate combinations can be defined as $N=m^n$ where the number of vowels is n and the number of speakers is m. For example, when the number of vowels n=5 and the number of speakers m=3, $N=3^5=243$ candidate combinations can be defined. The combination score determiner 2420 determines cluster scores for respective defined candidate combinations (C1-CN). The determination result is stored in a combination score table CST that associates a combination ID, cluster IDs included in the combination, and a combination score, such as the one shown in FIG. 6B.

In this embodiment, the lower the pair score is, the higher a corresponding degree of the cluster pair to the same speaker is. Thus, among the candidate combinations, a combination that includes cluster pairs with the lowest pair scores can be considered to have the highest corresponding degree to the same speaker. Thus, the combination determiner 240 of this embodiment determines a combination with the lowest combination score from the combination score table CST of FIG. 6B as a first corresponding combination. It is noted that when a corresponding degree to the same speaker is higher as the pair score is higher, a combination with the highest combination score may be determined as a first corresponding combination. The same is applied hereinafter.

Next, the combination determiner 240 determines a combination with the lowest combination score among candidate combinations that do not include clusters included in the already determined corresponding combinations as a next corresponding combination. In this way, the combination determiner 240 determines corresponding combinations for the number of speakers. Each of the determined corresponding combinations becomes a combination that corresponds to feature quantities of all vowels for one of speakers in the voice data. Thus, a speaker number can be assigned to each of the determined combinations. The determination result of the combination determiner 240 can be shown, for example, as in a determined combination table DCT shown in FIG. 7.

The separator 250 separates voice sections of the voice data for each speaker, based on the timing when vowel sections of feature quantities included in the clusters of each corresponding combination determined by the combination determiner 240, appear in the voice data.

Figures 8A, 8B:
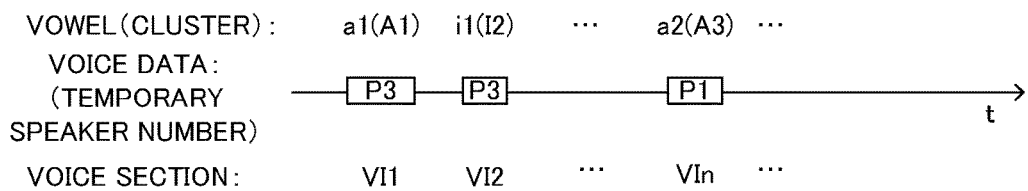
FIG. 8A is a diagram for illustrating processing of assigning a temporary speaker number.
FIG. 8B is a diagram showing an example of a temporary speaker table.

In particular, the separator 250 first assigns a temporary speaker number to each vowel section according to a speaker number of the corresponding combination to which a cluster that includes the feature quantity belongs. For example, as shown in FIG. 8A, when a vowel section VI1 (vowel a1) is included in a cluster A1, a speaker number P3 of the corresponding combination to which the cluster A1 belongs is set as a temporary speaker number. Thereafter, a temporary speaker number is allocated similarly to each vowel section included in the voice data. The allocated result is, for example, as shown in FIG. 8B, stored in a temporary speaker table PT that associates a vowel ID, information that indicates a vowel section, and a temporary speaker number.

The temporary speaker number is a result of speaker diarization using the clustering result without smoothing. For example, if there is an error in the result of the clustering carried out by the feature quantity classifier 230, speakers are determined to be switched at the feature quantity with the error, even through the speakers are not actually switched. Since it cannot be expected that there would be no error in the clustering result, the precision of the result of speaker diarization is degraded in this way.

Next, the separator 250 separates each voice section (vowel section and consonant section) for each speaker based on the temporary speaker number allocated to each voice section. For example, the separator 250 identifies, for each vowel section, the mode value of temporary speaker numbers that are allocated to x number of vowel sections before and after the vowel section. Then, the identified speaker number is defined as a definite speaker number of the voice section.

Figures 9A, 9B:
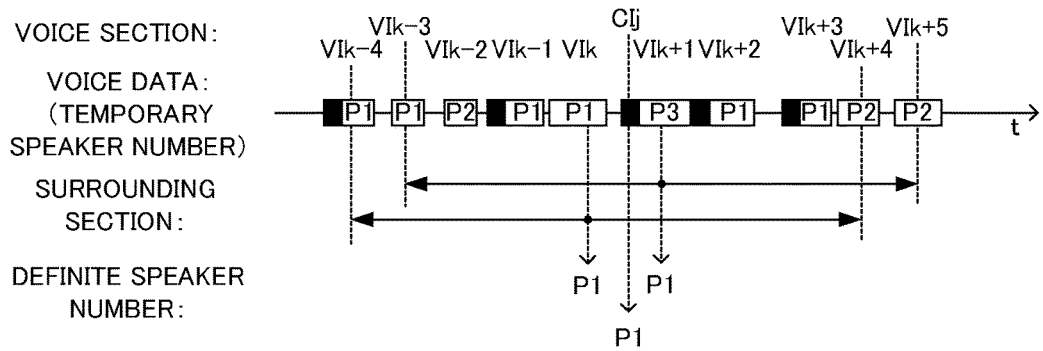
FIG. 9A is a diagram for illustrating processing of determining a definite speaker number.
FIG. 9B is a diagram showing an example of a definite speaker table.

This processing will be described with FIG. 9A as an example. In FIG. 9A, speaker diarization is carried out for two kinds of voice sections: vowel sections indicated by white rectangles on the voice data; and consonant sections indicated by black rectangles.

For example, in case of a vowel section VIk shown in FIG. 9A, five of a temporary speaker number P1, two of P2, and one of P3, are assigned for four vowel sections respectively before and after the vowel section VIk (vowel sections VIk−4 to VIk+4). In this case, P1 that is the mode value becomes a definite speaker number of the vowel section VIk. Likewise, in case of a vowel section VIk+1, the mode value, P1, of the four vowel sections respectively before and after the vowel section VIk+1 (vowel sections VIk−3 to VIk+5) becomes a definite speaker number.

Such processing can perform smoothing on the result of the speaker diarization that is initially carried out, using information of surrounding vowel sections. Thus, even if there are some errors in the result of the clustering that the feature quantity classifier 230 carried out, erroneous speaker switch points can be corrected based on information of a surrounding predetermined term. As a result, highly precise speaker diarization can be realized.

After assigning a definite speaker number for each vowel section, the separator 250 next carries out speaker diarization of consonant sections. In this embodiment, a definite speaker number is assigned to a consonant section based on definite speaker numbers determined for vowel sections before and after the consonant section as a processing object. For example, as in case of CIj of FIGS. 9A and 9B, if the consonant section is surrounded by vowel sections to which the same definite speaker number is assigned, the same speaker number as those of the vowel sections before and after the consonant section is assigned to the consonant section. If different definite speaker numbers are determined for the surrounding vowel sections, a definite speaker number that is determined for the vowel section that is closer in time distance to the consonant section is determined as a definite speaker number of the consonant section.

The separator 250 carries out speaker diarization by assigning definite speaker numbers to respective voice sections. The result of the speaker diarization is, for example, as shown in FIG. 9B, stored in a definite speaker table DST that associates information that indicates a voice section with a definite speaker number. Then, the outputter 40 outputs the definite speaker table DST. Alternatively, the display 30 displays a screen that shows the definite speaker table DST.

Figure 10:
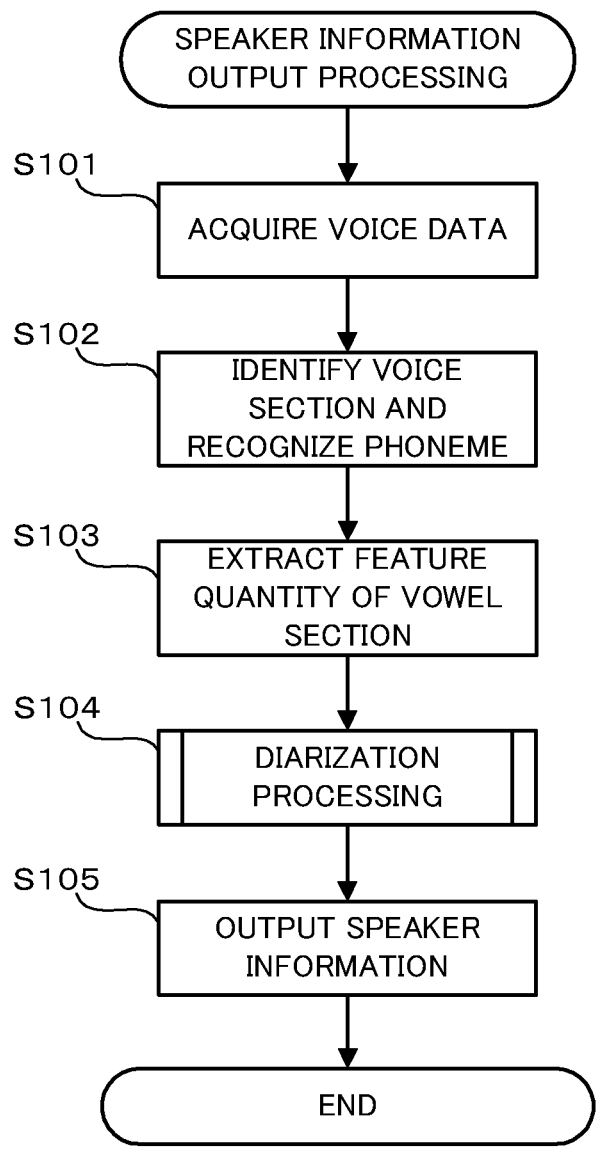
FIG. 10 is a flowchart showing an example of speaker information output processing.

Next, the processing that the voice processing device 1 carries out will be described with reference to the flowcharts. The voice processing device 1 starts speaker information output processing shown in FIG. 10 when operation for instructing execution of speaker diarization using the operator 60 is carried out after a user stores voice data to the voice data memory 210 by recording a voice using the microphone 10, retrieving a voice using an inputter 50, or any other method.

In the speaker information output processing, first, the feature quantity extractor 220 acquires voice data stored in the voice data memory 210 (Step S101). Then, voice sections are identified and phoneme recognition is carried out for the acquired voice data (Step S102).

Next, the feature quantity extractor 220 extracts 16-dimensional ISPs for each vowel section that is identified as a result of the phoneme recognition, and stores the 16-dimensional ISPs in the feature quantity table FT (Step S103).

When Step S103 ends, the feature quantity classifier 230 starts diarization processing (Step S104).

Figure 11:
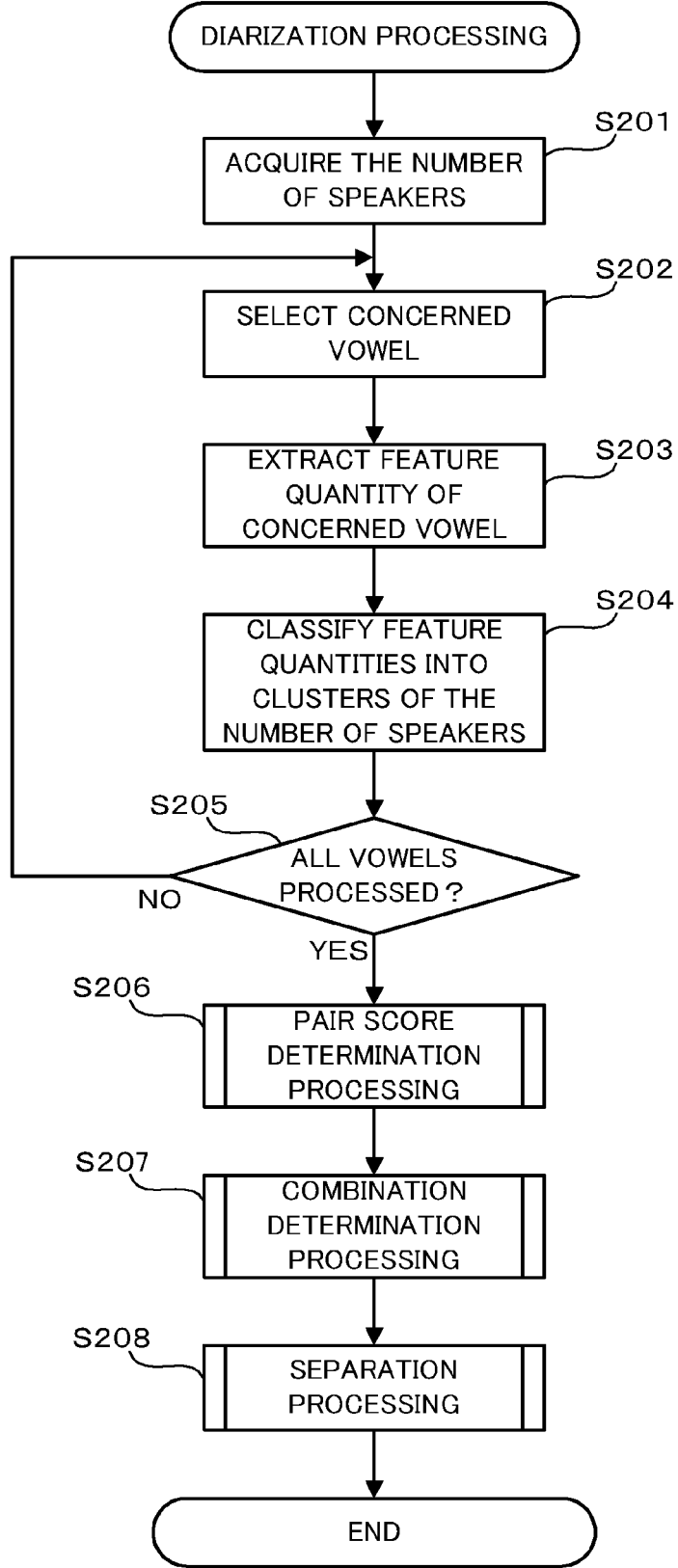
FIG. 11 is a flowchart showing an example of diarization processing.

The diarization processing carried out in Step S104 will be described with reference to FIG. 11. In the diarization processing, first, the feature quantity classifier 230 acquires the number of speakers (Step S201). Suppose that the number of speakers is input by a user in advance using the operator 60 and stored in the RAM 22.

When Step S201 ends, the feature quantity classifier 230 selects a concerned vowel to be a processing object in the current loop from vowels included in the set language (Step S202).

Next, the feature quantity classifier 230 extracts feature quantities of the concerned vowel from the feature quantity table FT (Step S203). For example, when the concerned vowel is "a," a new feature quantity table may be created by collecting only rows of vowel type "a" from the feature quantity table FT. The new feature quantity table stores only feature quantities corresponding to the same vowel.

Next, the feature quantity classifier 230 classifies the extracted feature quantities of the concerned vowel into clusters of the number acquired in Step S201 (Step S204). The clustering is realized by creating a VQ table with LBG method.

When the clustering regarding the concerned vowel ends, next, the feature quantity classifier 230 judges whether clustering processing has completed for all vowels as processing objects (Step S205). If there is an unprocessed vowel (Step S205; No), the processing repeats from Step S202 with the next unprocessed vowel as a concerned vowel. On the other hand, if all vowels have been processed (Step S205; Yes), the pair score determiner 2410 starts pair score determination processing (Step S206).

Figure 12:
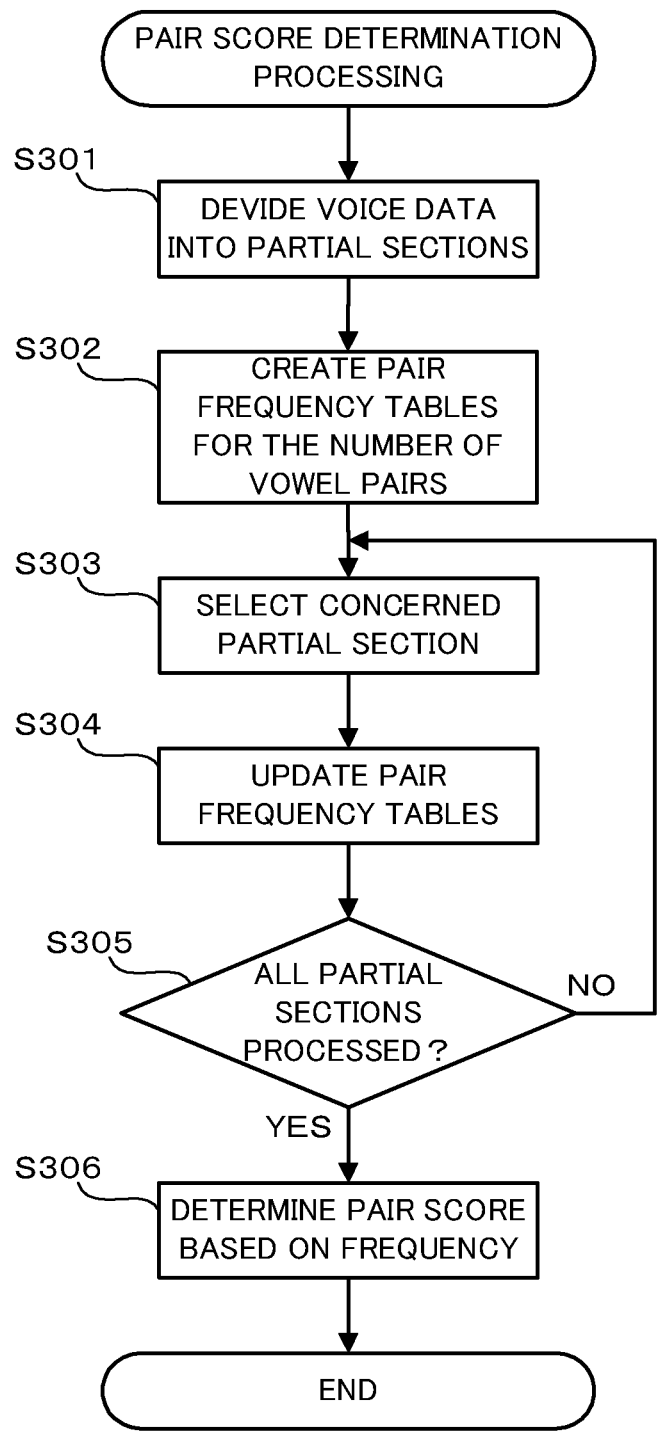
FIG. 12 is a flowchart showing an example of pair score determination processing.

The pair score determination processing carried out in Step S206 will be described with reference to FIG. 12. In the pair score determination processing, first, the pair score determiner 2410 divides, the voice data into partial sections in terms of time (Step S301).

Next, the pair score determiner 2410 creates a prototype of the pair frequency table PFT for all vowel pairs that can be defined for all vowels for which clustering is carried out by the feature quantity classifier 230 (Step S302). For example, when clustering is carried out for the five vowels in Japanese, $_5C_2$=10 pair frequency tables may be created in a predetermined area of the RAM 22. The pair frequency table, as shown in FIG. 5B, includes cells that record frequency values, of which number is equivalent to the number of clusters for one vowel multiplied by the number of clusters for the other vowel, for each cluster pair that is defined for the vowel pair. In this embodiment, this number is equivalent to the square of the number of speakers.

Next, the pair score determiner 2410 selects, as a concerned partial section, one of unprocessed partial sections from the partial sections created by division in Step S301 (Step S303). For example, a partial section may be selected one by one from the head of the voice data towards the end.

Next, the pair score determiner 2410 updates all pair frequency tables based on the frequency of co-occurrence, in the concerned partial section, of vowel sections of feature quantities included in each cluster pair defined in the pair frequency table (Step S304).

In particular, with regard to a cluster pair that corresponds to each cell of each pair frequency table, when vowel sections of feature quantities that are included in both clusters coexist in the concerned partial section, a occurrence frequency count is incremented by 1. This processing is carried out for all the cells to update one pair frequency table. It is noted that, as described above, when partial sections are defined by dividing the voice data equally in terms of time, the number a of occurrence of vowel sections of feature quantities included in one cluster and the number b of occurrence of vowel sections of feature quantities included in the other cluster may be counted together, and using the counted a and b, a value of a×b/2 may be added to the current cell as a frequency of co-occurrence of the cluster pair in the concerned partial section.

When all pair frequency tables are updated in Step S304, next, the pair score determiner 2410 judges whether or not the above processing has completed for all partial sections defined in Step S301 (Step S305). If there is an unprocessed partial section (Step S305; No), the processing repeats from Step S303 for the next unprocessed partial section. On the other hand, if all partial sections have been processed (Step S305; Yes), since counting of frequency ends and the pair frequency tables PFT have completed, the processing proceeds to Step S306.

In Step S306, the pair score determiner 2410 determines pair scores based on the frequencies stored in the pair frequency tables PFT (Step S306). In particular, by reassigning numerical values from one in the descending order of the frequency, each pair frequency table PFT is converted to a pair score table PST. In this way, all pair scores are determined.

Returning to FIG. 11, when all pair scores are determined in Step S206, then, the combination determiner 240 starts combination determination processing (Step S207).

Figure 13:
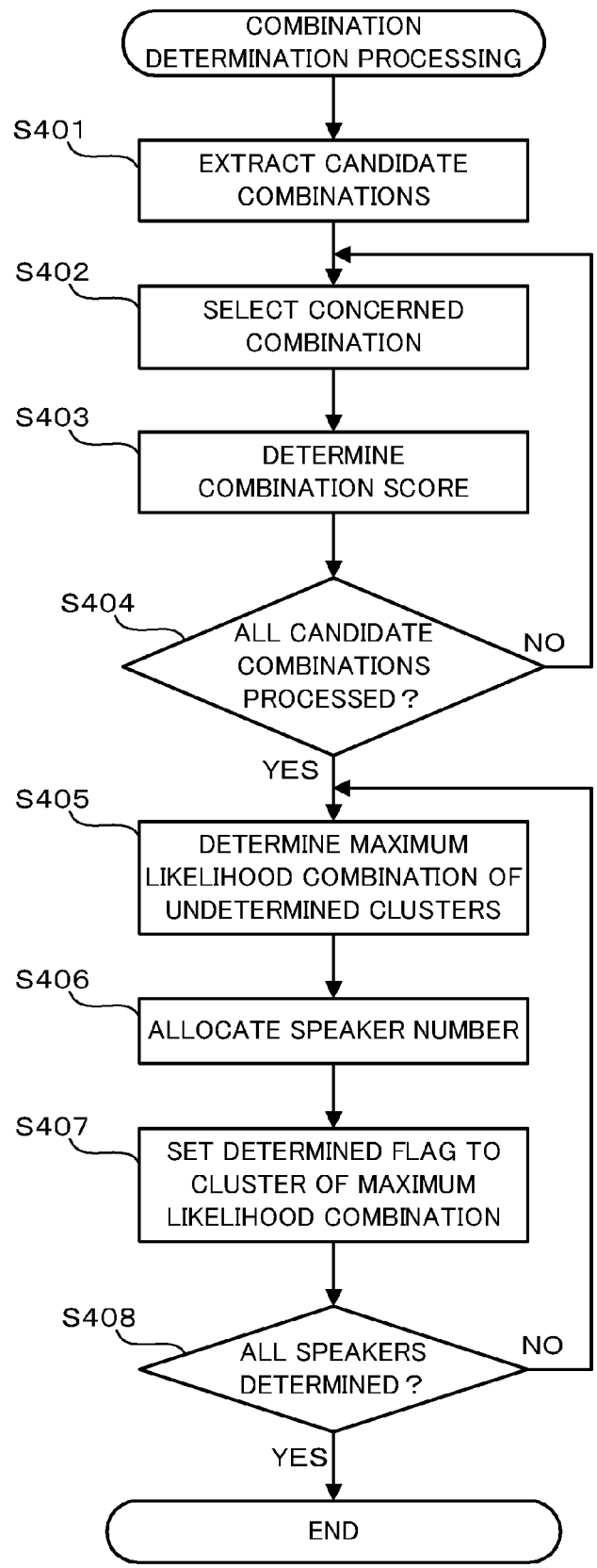
FIG. 13 is a flowchart showing an example of combination determination processing.

The combination determination processing carried out in S207 will be described with reference to FIG. 13. In the combination determination processing, the combination score determiner 2420 first extracts, as candidate combinations, all combinations each of which includes one cluster each extracted from respective vowels of the generated cluster groups (Step S401).

When the candidate combinations are extracted, next, the combination score determiner 2420 selects a concerned combination to be a processing object of the current loop among the extracted candidate combinations (Step S402). Then, with regard to the selected concerned combination, the combination score determiner 2420 determines a combination score as described with reference to FIG. 6 (Step S403).

Next, the combination score determiner 2420 judges whether or not the processing of determining a combination score has finished for all candidate combinations extracted in Step S401 (Step S404). If there is an unprocessed candidate combination (Step S404; No), the processing repeats from Step S402 for the next unprocessed candidate combination. On the other hand, if combination scores have been determined for all candidate combinations (Step S404; Yes), the processing proceeds to Step S405.

Next, the combination determiner 240 determines a corresponding combination that corresponds to each speaker based on the determined combination scores (Steps S405-S408). The combination determiner 240 first determines a combination of undetermined clusters with the highest correspondence likelihood to the same speaker (maximum likelihood combination) among the candidate combinations (Step S405). It is noted that the combination of undetermined clusters refers to a combination that does not include any cluster with a determined flag being set, as will be described later. In the first loop, since the determined flag is not set with any cluster, a combination with the smallest combination score, among combinations recorded in the combination score table, is determined as the maximum likelihood combination.

Next, the combination determiner 240 allocates a speaker number to the determined maximum likelihood combination (Step S406). While the speaker number may be any number as long as the number is unique for each loop, in this case, numbers such as P1, P2, . . . are allocated sequentially for each loop. For example, if a combination that includes clusters A3, I1, U2, E2, and O1 is first determined as the maximum likelihood combination, as shown in FIG. 7, the combination may be associated with a speaker number P1 and stored in the determined combination table DCT.

Next, the combination determiner 240 sets determined flags to clusters included in the maximum likelihood combination (Step S407). In this case, determined flags are set to the clusters A3, I1, U2, E2, and O1. Hereafter, in the loop of Steps S405-S408, a candidate combination that includes even one cluster to which a determined flag is set, is eliminated from the determination object in Step S405.

With such processing, from the result of clustering for each vowel, combinations of vowel feature quantities corresponding to the same person can be determined in the order from the highest likelihood without overlapping of clusters.

Therefore, while enhancing the precision by carrying out the clustering processing for each vowel, a fewer amount of calculation can identify what kind of feature quantities each speaker utters for a plurality of vowels.

Next, the combination determiner 240 judges whether or not corresponding combinations have been determined for all speakers up to the number acquired in Step S201 of the diarization processing (FIG. 11) (Step S408). If the corresponding combinations have not been determined for all speakers (Step S408; No), the processing repeats from Step S405 for the candidate combination that is a combination of clusters to which a determined flag is not set. Meanwhile, if the corresponding combinations have been determined for all speakers (Step S408; Yes), the combination determination processing ends.

Returning to FIG. 11, when all corresponding combinations are determined in Step S207, next, the separator 250 starts separation processing (Step S208).

Figure 14:
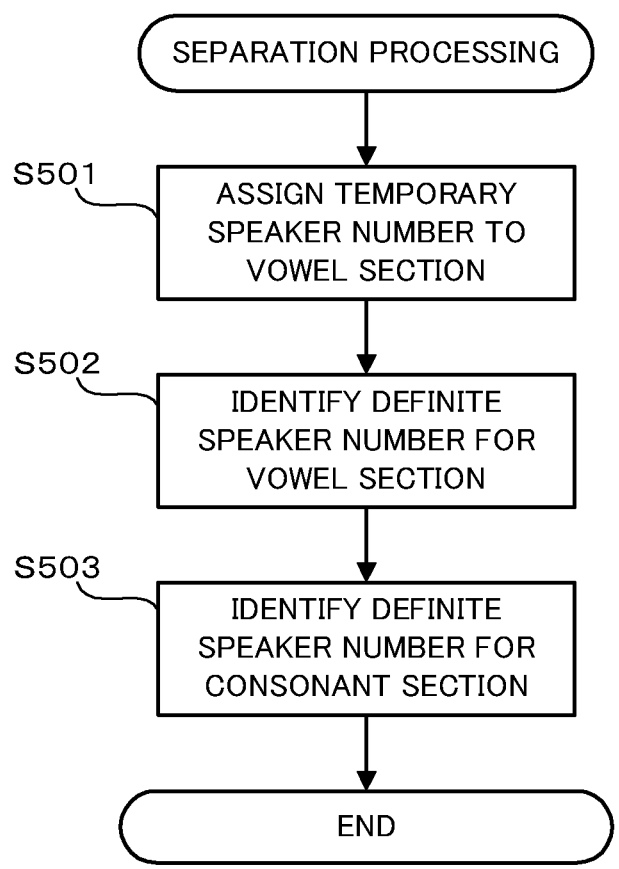
FIG. 14 is a flowchart showing an example of separation processing.

The separation processing carried out in Step S208 will be described with reference to FIG. 14. In the separation processing, first, the separator 250 assigns a temporary speaker number to each vowel section (Step S501). In particular, as described with reference to FIG. 8, the separator 250 assigns a temporary speaker number to each vowel section, according to the speaker number of the corresponding combination to which a cluster including the feature quantity of the vowel section belongs.

Then, the separator 250 identifies a definite speaker number for each vowel section (Step S502). In particular, as described with reference to FIG. 9, the separator 250 identifies, for each vowel section, the mode value of the temporary speaker numbers allocated to four vowel sections respectively before and after the vowel section, as the definite speaker number.

Next, the separator 250 identifies a definite speaker number for each consonant section (Step S503). In particular, as described with reference to FIG. 9, the separator 250 identifies the definite speaker number for each consonant section, based on the definite speaker numbers allocated to vowel sections before and after the consonant section. Then, the separation processing ends.

Returning to FIG. 11, when the separation processing ends in Step S208, the diarization processing ends.

Returning to FIG. 10, when the diarization processing ends in Step S104, the outputter 40 outputs information indicating the result of the speaker diarization (definite speaker table DST) (Step S105).

Then, the speaker information output processing ends.

As described so far, in the voice processing device 1 of this embodiment, the classifier 230 classifies feature quantities corresponding to the same vowel into a plurality of clusters with unsupervised classification. Then, the combination determiner 240 determines a combination corresponding to the same speaker from the classified feature quantities. When carrying out speaker diarization without prior registration of speakers, what becomes a problem particularly, is difficulty of identifying the feature quantities in the sections where the same speaker pronounced. In that respect, in the voice processing device 1 of this embodiment, vowel sections of feature quantities included in the cluster combination determined by the combination determiner 240 can be considered as utterance of the same speaker, which makes the speaker diarization easy.

Particularly, when classifying feature quantities with unsupervised classification, if batch clustering of the feature quantities of voices is carried out regardless of phonemes, the clustering precision decreases. However, if clustering is carried out separately, as a correspondence between each cluster and a speaker is unknown, speaker diarization becomes difficult. Thus, in this embodiment, the cluster combinations corresponding to the same speaker are determined after clustering of feature quantities corresponding to the same vowel is carried out, whereby the speaker diarization is made easy while maintaining the clustering precision.

Further, in the voice processing device 1 of this embodiment, the separator 250 separates voice sections of the voice data for each speaker based on the timing when the voice sections included in the cluster combinations determined by the combination determiner 240 appear in the voice data. Then, the separation result is output. In this way, speaker diarization can be carried out without prior registration of speakers.

In the voice processing device 1 of this embodiment, clustering is separately carried out for the feature quantities corresponding to the same vowel, realizing high clustering precision. Thus, the voice processing device 1 can realize more precise speaker diarization than clustering without making any distinction of phonemes. Further, while enhancing the precision by carrying out the clustering processing for each vowel, a fewer amount of calculation can identify what kind of feature quantities of vowels each speaker utters.

Further, as speaker diarization is carried out based on the result of clustering for each of a plurality of vowels, even vowels with low clustering precision can be compensated by other vowels, suppressing degradation of precision of the speaker diarization.

Further, in the speaker diarization, clustering objects are limited to vowels that reflect clear characteristics of each speaker. This prevents diluting of differences between speakers due to consonants and noises of which differences are obscure, making the precision of speaker diarization high. Further, since voice sections to be processing objects are limited to the vowel sections, a fewer amount of calculation is required.

Further, using the result of clustering for each vowel, the corresponding combination is determined based on the timing when the vowel sections of feature quantities included in each classified cluster appear in the voice data. In a conversation, the vowel sections uttered by the same speaker are likely to be in closer proximity in terms of time than irrelevant vowel sections. Thus, by associating clusters with one another based on the appearance timing, correspondence between speakers and clusters can be appropriately determined.

In particular, a combination score that indicates a corresponding degree to the same speaker is determined for each of a plurality of candidate combinations, and the corresponding combination is determined according to the determined combination score. Having such a configuration, the corresponding combination can be determined more accurately than determining a combination without selecting candidates.

Particularly, in this embodiment, pair scores are determined for cluster pairs included in the candidate combinations, and a combination score is determined based on the determined pair scores. For clusters of two feature quantities, a corresponding degree to the same speaker can be calculated by a simple method with a fewer amount of calculation as described above. In this embodiment, using such a method, the corresponding combination can be determined with high precision and a fewer amount of calculation. As a result, high precision of speaker diarization can be realized with a fewer amount of calculation.

It is noted that a configuration in which a combination score is calculated from a plurality of pair scores is effective when the candidate combination includes a plurality of cluster pairs. That is, the configuration is effective when the candidate combination includes at least three clusters.

In this embodiment, a pair score is determined based on the frequency of co-occurrence in the partial section of the voice data, of vowel sections of feature quantities included in one cluster of the cluster pair and vowel sections of feature quantities included in the other cluster. The processing of counting the frequency of vowel sections of feature quantities in both clusters is simple, involves a fewer amount of calculation, and, is superior as an index of the corresponding degree to the same speaker. By determining a pair score with such a method, the corresponding combination can be determined with high precision and a fewer amount of calculation. As a result, high precision of speaker diarization can be realized with a fewer amount of calculation.

Modification Example

The first embodiment of the present disclosure has so far been described, but the embodiments of the present disclosure are not limited thereto.

For example, the above embodiment mainly describes the processing of voice data that record a conversation in Japanese including five vowels. However, the present disclosure is not limited to Japanese, and, can be applied to arbitrary languages such as English, Chinese, and French. Even in such cases, the processing can be carried out in the same way with increase/decrease in the number of vowels and the number of combinations, depending on the number of vowels of the language, to be processed by the feature quantity classifier and the combination determiner.

Further, in the above embodiment, while clustering and combination determination processing is carried out for all vowels included in the language in use, the present disclosure is not limited thereto, and the present disclosure is effective even in a configuration in which the above processing is carried out for some of the vowels of the language in use. Particularly, in a language with many vowels such as English, the processing volume becomes large when clustering and combination determination processing is carried out for all vowels included in the language. Thus, similar vowels such as "a" and "A" may be treated as one vowel to carry out clustering and other processing. Alternatively, the above processing may be carried out only for vowels in which individual feature quantities obviously appear.

In the above embodiment, clustering is carried out with the number of speakers as a known numerical value. However, the present disclosure can be applied to a case with unknown number of speakers. For example, in Step S204 of the diarization processing (FIG. 11), the number of clusters of feature quantities is estimated for each vowel. Then, the mode value of the estimated number of clusters for each vowel is estimated as the number of speakers, and the clusters may be classified in the renewed estimation of the number of speakers. For example, if, as the estimated number of clusters, four for the vowel "a," four for the vowel "i," three for the vowel "u," three for the vowel "e," and four for the vowel "o," are obtained respectively, the mode value of four is estimated as the number of speakers. Then, for vowels with different estimated number of speakers from the mode value (in this example, the vowel "u" and the vowel "e"), the clusters are classified in the mode value of four. It is noted that the method of estimating the number of speakers is not limited thereto. Other methods include a method that applies the estimated number of speakers for vowels in which characteristics of speakers are obvious (for example, "a" or "i") to other vowels. It is noted that the number of clusters can be estimated using a known method such as Ward method, Upper tail method, and X-means method.

Further, the output information is not limited to FIG. 9B, and may be arbitrary information that a user desires as long as the result of speaker diarization is included. The output information may be in a different format. For example, the output information may be a file that associates speaker switch point timing with a speaker number after switching, or voice data divided for each speaker.

Figure 15A:
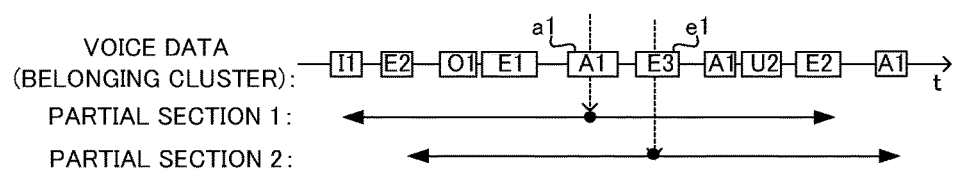
FIGS. 15A and 15B are diagrams for illustrating processing of counting a frequency according to a modification example.

Further, the method of determining a combination corresponding to the same speaker is not limited to the example of the above embodiment. For example, when calculating a pair score, the method of counting the frequency of a cluster pair is not limited to the method exemplified in the above embodiment. For example, the frequency may be calculated by setting a predetermined time (for example, ten seconds) as a partial section centering on each vowel section. For example, as shown in FIG. 15A, if a vowel section a1 included in a cluster A1 is the concerned vowel section, by defining a partial section 1 centering on a1, the number of appearances, in the partial section 1, of the vowel sections in the clusters of other vowels is counted. In this case, in the partial section 1, I1 appears once, U2 appears once, E2 appears twice, E3 appears once, and O1 appears once respectively. Then, in the frequency table, 1 is added to A1-I1 cell, 1 is added to A1-U2 cell, 2 is added to A1-E2 cell, 1 is added to A1-E3 cell, and 1 is added to A1-O1 cell respectively. The frequency may be calculated by carrying out such a count processing centering on each vowel section.

Figure 15B:
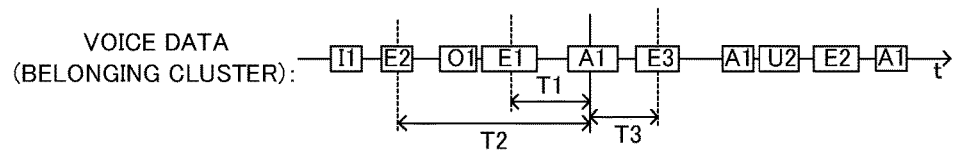

Further, when calculating a pair score, the pair score may be calculated using other methods in which a corresponding degree to the same person becomes higher as vowel sections included in two clusters in the pair appear closer. For example, as shown in FIG. 15B, the pair score can be determined based on the distance (T1, T2, T3) between vowel sections included in both clusters. In particular, instead of frequency, the mean value of distances between vowel sections of the cluster pair may be treated as the cluster score. In such a case, the lower the cluster score is, the higher the corresponding degree to the same person becomes.

Further, the method of calculating a combination score from pair scores is not limited to the method exemplified in the above embodiment. For example, in the above embodiment, the combination score is calculated by equally evaluating each pair score. However, the combination score may be a value that is weighted-summed using different weight for each vowel pair. For example, among Japanese vowels, while "a" and "i" show clear characteristics depending on each speaker, accurate clustering is difficult for "u." Thus, the combination score may be calculated by weighting the pair scores of vowel pairs including "a" and "i" by 1.5 and by weighting the pair scores of vowel pairs including "u" by 0.7. Such a configuration realizes speaker diarization with higher precision that reflects characteristics of each phoneme.

Further, methods other than calculating combination scores for candidate combinations may be employed. For example, one cluster pair with the highest frequency is identified from all pair score tables. Then, among other cluster pairs that include the cluster included in the identified cluster pair, a cluster pair with the highest frequency is identified. Thereafter, the combinations with the highest frequency are determined for all vowels, thereby easily determining the combination corresponding to the same speaker. Thereafter, excluding the identified clusters, a cluster pair with the highest frequency is consecutively determined from the rest of the tables, thereby determining the combinations corresponding to respective speakers. Such a configuration enables determining the corresponding combinations with a fewer amount of calculation.

It is noted that the present disclosure can not only provide the voice processing device 1 according to the first embodiment and the modification examples, but can also cause a general computer, such as an existing personal computer, to function as the voice processing device 1 by applying a certain program. That is, by applying a text search program for realizing functional components of the voice processing device 1 to a computer (such as CPU) that controls an existing text search device so that the computer can execute the program, the computer can function as the voice processing device 1 according to the first embodiment or the modification examples.

Such a program delivery method is arbitrary, and for example, the program can be delivered by storing in a non-transitory recording medium such as a memory card, a Compact Disc Read Only Memory (CD-ROM) and a Digital Versatile Disk Read Only Memory (DVD-ROM), or delivered via a communication medium such as the Internet. Further, the part or the whole of data required for the above processing, may be stored in an external server, and the data can be acquired by a communication function to carry out the above processing.

Further, the present disclosure can be applied to a variety of embodiments and modifications without departing from the broad spirit and scope of the present disclosure. That is, while some embodiments of the present disclosure have been described, the above-described embodiments are merely for the purpose of describing the present disclosure and do not limit the scope of the present disclosure. The scope of the present disclosure includes, without limitation to the embodiments, the invention described in the assigned claims and the equivalents.

What is claimed is:

1. A voice processing method of a voice processing device, the voice processing device comprising a processor which performs the voice processing method, and the method comprising:
  acquiring feature quantities of vowel sections included in voice data in which utterances of a plurality of speakers are mixed;
  classifying, among the acquired feature quantities, feature quantities that correspond to a plurality of same vowels into clusters a number of which corresponds to a number of the speakers for respective vowels with unsupervised classification, thereby associating one of the clusters with one of the speakers and another one of the clusters with another one of the speakers;
  determining a combination of clusters corresponding to a same speaker from the clusters that are classified for the respective vowels;
  separating voice sections of the voice data for each speaker based on a timing at which vowel sections of feature quantities, included in the clusters the combination of which is determined for the same speaker, appear in the voice data; and
  outputting information indicating a result of the separating on a display or in a data file;
  wherein:
  the determining determines the combination of clusters corresponding to the same speaker based on a timing at which vowel sections of feature quantities included in the respective classified clusters appear in the voice data;
  the determining determines a combination score that indicates a corresponding degree to a same speaker for each of a plurality of combinations as candidate combinations of clusters corresponding to the same speaker, and determines the combination of clusters corresponding to the same speaker according to the determined combination score;
the classifying carries out classification processing for at least three vowels of vowels included in a language that the speakers used; and
the determining comprises:
determining a pair score that indicates a corresponding degree to a same speaker for a cluster pair, a cluster being extracted from each of clusters classified by the classifying for two different vowels to obtain the cluster pair;
generating the candidate combination by extracting one cluster for each vowel for which the classifying carries out the classification processing; and
determining the combination score based on a pair score determined for a cluster pair included in the generated candidate combination.

2. The voice processing method according to claim 1, wherein the determining determines the pair score based on a frequency of co-occurrence, in a partial section of the voice data, of vowel sections of feature quantities included in one cluster of the cluster pair and vowel sections of feature quantities included in the other cluster of the cluster pair.

3. The voice processing method according to claim 1, wherein the information output in the outputting includes information indicating that the vowel sections appearing in the voice data correspond to the same speaker.

4. The voice processing method according to claim 1, wherein the information output in the outputting includes information indicating at least one of (i) an alternating timing at which a speaker alternates from among the plurality of speakers, and (ii) a sound file corresponding to the same speaker.

5. A non-transitory recording medium having a program recorded thereon for controlling a computer of a voice processing device, the program being executable to control the computer to execute:
acquisition processing which acquires feature quantities of vowel sections included in voice data in which utterances of a plurality of speakers are mixed;
classification processing which classifies, among the acquired feature quantities, feature quantities that correspond to a plurality of same vowels into clusters a number of which corresponds to a number of the speakers for respective vowels with unsupervised classification, thereby associating one of the clusters with one of the speakers and another one of the clusters with another one of the speakers;
combination determination processing which determines a combination of clusters corresponding to a same speaker from the clusters that are classified for the respective vowels;
separation processing which separates voice sections of the voice data for each speaker based on a timing at which vowel sections of feature quantities, included in the clusters the combination of which is determined for the same speaker, appear in the voice data; and
output processing which outputs information indicating a result of the separation processing on a display or in a data file;
wherein:
the combination determination processing determines the combination of clusters corresponding to the same speaker based on a timing at which vowel sections of feature quantities included in the respective classified clusters appear in the voice data;
the combination determination processing determines a combination score that indicates a corresponding degree to a same speaker for each of a plurality of combinations as candidate combinations of clusters corresponding to the same speaker, and determines the combination of clusters corresponding to the same speaker according to the determined combination score;
the classification processing is carried out for at least three vowels of vowels included in a language that the speakers used; and
the combination determination processing comprises:
determining a pair score that indicates a corresponding degree to a same speaker for a cluster pair, a cluster being extracted from each of clusters classified by the classification processing for two different vowels to obtain the cluster pair;
generating the candidate combination by extracting one cluster for each vowel for which the classification processing is carried out; and
determining the combination score based on a pair score determined for a cluster pair included in the generated candidate combination.

6. The non-transitory recording medium according to claim 5, wherein the combination determination processing determines the pair score based on a frequency of co-occurrence, in a partial section of the voice data, of vowel sections of feature quantities included in one cluster of the cluster pair and vowel sections of feature quantities included in the other cluster of the cluster pair.

7. The non-transitory recording medium according to claim 5, wherein the information output in the output processing includes information indicating that the vowel sections appearing in the voice data correspond to the same speaker.

8. The non-transitory recording medium according to claim 5, wherein the information output in the output processing includes information indicating at least one of (i) an alternating timing at which a speaker alternates from among the plurality of speakers, and (ii) a sound file corresponding to the same speaker.

9. A voice processing device comprising:
a processor which performs:
acquisition processing which acquires feature quantities of vowel sections included in voice data in which utterances of a plurality of speakers are mixed;
classification processing which classifies, among the acquired feature quantities, feature quantities that correspond to a plurality of same vowels into clusters a number of which corresponds to a number of the speakers for respective vowels with unsupervised classification, thereby associating one of the clusters with one of the speakers and another one of the clusters with another one of the speakers;
combination determination processing which determines a combination of clusters corresponding to a same speaker from the clusters that are classified for the respective vowels;
separation processing which separates voice sections of the voice data for each speaker based on a timing at which vowel sections of feature quantities, included in the clusters the combination of which is determined for the same speaker, appear in the voice data; and output processing which outputs information indicating a result of the separation processing on a display or in a data file;

wherein:

the combination determination processing determines the combination of clusters corresponding to the same speaker based on a timing at which vowel sections of feature quantities included in the respective classified clusters appear in the voice data;

the combination determination processing determines a combination score that indicates a corresponding degree to a same speaker for each of a plurality of combinations as candidate combinations of clusters corresponding to the same speaker, and determines the combination of clusters corresponding to the same speaker according to the determined combination score;

the classification processing is carried out for at least three vowels of vowels included in a language that the speakers used; and the combination determination processing comprises:

determining a pair score that indicates a corresponding degree to a same speaker for a cluster pair, a cluster being extracted from each of clusters classified by the classification processing for two different vowels to obtain the cluster pair;

generating the candidate combination by extracting one cluster for each vowel for which the classification processing is carried out; and determining the combination score based on a pair score determined for a cluster pair included in the generated candidate combination.

10. The voice processing device according to claim 9, wherein the combination determination processing determines the pair score based on a frequency of co-occurrence, in a partial section of the voice data, of vowel sections of feature quantities included in one cluster of the cluster pair and vowel sections of feature quantities included in the other cluster of the cluster pair.

11. The voice processing device according to claim 9, wherein the information output in the output processing includes information indicating that the vowel sections appearing in the voice data correspond to the same speaker.

12. The voice processing device according to claim 9, wherein the information output in the output processing includes information indicating at least one of (i) an alternating timing at which a speaker alternates from among the plurality of speakers, and (ii) a sound file corresponding to the same speaker.

* * * * *